(12) United States Patent
Hansen et al.

(10) Patent No.: US 6,458,436 B1
(45) Date of Patent: Oct. 1, 2002

(54) MAN-MADE VITREOUS FIBRES AND THEIR PRODUCTION

(75) Inventors: Erling Hansen, Gentofte (DK); Povl Nissen, Olstykke (DK); Soren Lund Jensen, Holte (DK)

(73) Assignee: Rockwool International A/S (DK)

( * ) Notice: Subject to any disclaimer, the term of this patent is extended or adjusted under 35 U.S.C. 154(b) by 0 days.

This patent is subject to a terminal disclaimer.

(21) Appl. No.: 09/077,950

(22) PCT Filed: Dec. 13, 1996

(86) PCT No.: PCT/EP96/05617

§ 371 (c)(1),
(2), (4) Date: Aug. 11, 1998

(87) PCT Pub. No.: WO97/21636

PCT Pub. Date: Jun. 19, 1997

(30) Foreign Application Priority Data

Dec. 13, 1995 (GB) .............................. 9525475

(51) Int. Cl.[7] .......................... D02G 3/00; D02G 3/18; D04H 5/00
(52) U.S. Cl. ................... 428/34.5; 428/36.91; 428/375; 428/378; 428/379; 428/389; 428/391; 501/36; 501/38; 501/70; 501/73; 442/332
(58) Field of Search .............................. 428/34.5, 34.6, 428/34.7, 36.91, 375, 376, 378, 389, 391, 379; 501/36, 38, 70, 73; 442/332

(56) References Cited

U.S. PATENT DOCUMENTS

T979,008 I4    2/1979 Pessoli 5,658,836 A     8/1997   Rapp et al. .................. 501/36
5,932,500 A  *  8/1999   Jensen et al. ................ 501/36
5,935,886 A  *  8/1999   Jensen et al. ................ 501/36

FOREIGN PATENT DOCUMENTS

| DE | 2556539 A1 | 7/1976 |
| EP | 0459897 A1 | 12/1991 |
| EP | 0539342 B1 | 4/1993 |
| GB | 1473392 | 5/1977 |
| JP | 2-149453 | 6/1990 |
| NL | 101164 | 3/1941 |
| WO | WO 8705007 | 8/1987 |
| WO | WO 8912032 | 12/1989 |
| WO | WO 9209536 | 6/1992 |
| WO | WO 9322251 | 11/1993 |
| WO | WO 94/02427 | 2/1994 |
| WO | WO 9414717 | 7/1994 |
| WO | WO 9521799 | 8/1995 |
| WO | WO 95/29135 | 11/1995 |
| WO | 9529135 | 11/1995 |
| WO | WO 9627562 | 9/1996 |

* cited by examiner

Primary Examiner—Rena L. Dye
(74) Attorney, Agent, or Firm—Dickstein, Shapiro, Morin & Oshinsky, LLP.

(57) ABSTRACT

Mineral fiber products, in particular rigid bonded mineral fiber products, are provided which comprise composite mineral fibers having a coating-core configuration wherein the core provides at least 90% by weight of the fibers and is formed of mineral melt and the coating is coated onto the core. The mineral melt is chosen so that the fibers without coating have adequate biological solubility and the coating comprises a phosphate or hydrogen phosphate of alkali metal, quaternary ammonium or ammonium in an amount of at least 0.3% or by weight of the core. The coated fibers retain their biological solubility while improving resistance to ageing in use.

34 Claims, 6 Drawing Sheets

MAN-MADE VITREOUS FIBRES AND THEIR PRODUCTION

The invention relates to mineral fibre products which have a solubility in biological fluid which is considered to be acceptable but which are durable in use and are based on rock, slag, stone or other mineral melt.

Some mineral fibres are made from vitreous mineral melt, such as of rock, slag or other mineral. The melt is formed by melting in a furnace a mineral composition having the desired analysis. This composition is generally formed by blending rocks or minerals to give the desired analysis.

Although there is no scientific evidence establishing that there is a health risk associated with the manufacture and use of these mineral fibres, commercial interests have led manufacturers to provide mineral fibres that can also be alleged to be of improved biological safety.

This allegation of improved safety is usually made on the basis of in vitro test that examines the dissolution rate or degradability of the fibres in a liquid which is intended to simulate lung fluid, such as Gamble's solution at about pH 7.5. The test is normally conducted under conditions whereby the fibres are immersed in a previously prepared Gamble's solution having the specified pH.

Numerous patent applications have been published describing fibres that give enhanced dissolution rate in such an in vitro test, such as WO87/05007, WO89/12032, EP 412,878, EP 459,897, EP 558,548 WO93/22251, WO94/14717 and WO95/21799.

As is apparent from the large amount of literature, of which examples are listed above, directed to the production of fibres which have good solubility as measured by an in vitro pH 7.5 test, a large amount of research has been conducted into optimising the composition of the mineral melt (and the resultant fibres) so as to obtain this high dissolution rate. This optimisation has been applied to the production of fibres that would normally be considered as glass fibres (e.g., in EP 412878) but has especially been applied to the production of fibres which would normally be considered as stone, rock or slag fibres, such as in EP 459878 or EP 558548 or WO95/21799.

The resultant fibres meet the environmental and regulatory desire to provide fibres which, on the basis of an in vitro test, can be shown to be environmentally desirable. An unfortunate consequence is that this research may lead to the production of fibres which fail to provide one of the originally inherent advantages of mineral fibres, namely inertness to ambient humidity. Thus a traditional mineral fibre product is substantially inert to the presence of atmospheric humidity whereas such a product based on cellulosic or other organic fibres may tend to collapse in the presence of atmospheric humidity.

Unfortunately, the mineral fibres which tend to be considered as having good biological solubility (for instance at least 20 and often at least 50 nm/day) have poor resistance to atmospheric humidity, which tends to condense onto the fibres. Thus, the attainment of the allegedly desirable biological solubility is often achieved at the expense of the essential property of inertness to condensed atmospheric humidity.

The condensed humidity may be due to the natural humidity in the atmosphere or the humidity due to wetting of the fibre product by occasional rain or application of cement or other water, especially in enclosed constructions.

There have been proposals to coat stone wool fibres to improve their resistance to hydrolysis in certain environments. For instance, WO94/02427 proposes immersing rock fibres in a composition comprising silane to coat them with silane. No disclosure is given of the particular fibres which are coated, so they would be assumed to be conventional rock fibres having poor solubility in the Gamble's solution test described above. The exemplified fibres are mixed with an SBR rubber composition to form sealing rings after treatment with silane. Use as a bonded insulation product is not described.

Transferring this knowledge to fibres specifically designed to have good solubility in the Gamble's solution test would appear to defeat the purpose of conducting the research and development necessary to produce mineral fibres having good solubility in the solubility test using Gamble's solution. Accordingly, it would appear that the desire for biological solubility is incompatible with the desire for mineral fibres which are relatively unaffected by condensed ambient humidity.

Coating of fibres such as stone wool for other purposes is described for instance in JP-A-2,149,453. Fibres are treated apparently to partially melt the surface by use of a solution comprising aluminium or magnesium by phosphate and a fluoric acid.

Various coatings have also been described for other types of fibre, for instance glass fibre. EP-8-539,342 describes some of these in its background section and also describes a coating composition for glass fibres which comprises aluminium oxide, orthophosphoric acid and water, which form an anionic polymer in situ. The coating is intended to replace the organic resins often coated onto glass fibres to reduce dust and breakage during shipping and handling. WO96/27562 describes coating glass fibres to improve their mechanical strength with weak acids such as boric acid or citric acid or a fatty acid. This binder treating solution can also contain other materials which include ammonium sulphate.

DE 2,556,539 and SE 101,164 also describe glass fibres which are to be used for reinforcement of cement products. The coating is intended to protect the glass fibres from attack by the alkaline environment which prevails in cement products and various alternative coatings are given. These include inorganic acids such as silicic acid and boric acid and organic acids such as oxalic and citric acid, as well as salts of alkali metal, alkaline earth metal and ammonium which include hydrogen phosphate, hydrogen sulphate, hydrogen carbonate, hydrogen borate, hydrogen oxalate, hydrogen citrate and hydrogen tartrate.

These disclosures relate solely to coating of glass fibres which are not designed to be soluble in the Gamble's solution test above.

The present invention is concerned with the problem of providing mineral fibres traditionally used for their properties of high insulation value and inertness, in particular in forms suitable for use where insulation properties are required. The invention is concerned with the problem of providing fibres which have satisfactory solubility in a biological environment but which do not have severely compromised resistance to atmospheric humidity when in use.

According to a first aspect of the invention we provide a mineral fibre product comprising composite man-made vitreous fibres which have a coating-core configuration wherein the core provides at least 90% by weight of the fibre and is formed of mineral melt formed from components having the following composition, expressed by weight of oxides:

| | |
|---|---|
| $SiO_2$ | 35–60 |
| $Al_2O_3$ | 0–12 |
| MgO | 0–30 |
| CaO | 10–45 |
| FeO (total iron) | 0–15 |
| $Na_2O + K_2O$ | 0–10 |
| $P_2O_5$ | 0–10 |
| $B_2O_3$ | 0–10 |
| $TiO_2$ | 0–10 |
| Others | 0–10 | and chosen such that fibres formed from the core alone have a solubility of at least 20 nm/day in Gamble's solution at pH 7.5 and 37° C.

and the coating is coated onto the core and comprises a salt which is a phosphate or hydrogen phosphate of ammonium or quaternary ammonium or alkali metal in an amount of at least 0.3% based on the weight of the core.

Products of the invention containing the defined composite man-made vitreous (MMV) fibres have good ageing resistance when exposed to humidity and/or condensation despite the fact that the majority of the fibre is produced from mineral melt chosen specifically to give a fibre which would be called a "soluble" fibre without the coating. We find that it is possible to obtain fibres of this type by coating with selected phosphate-containing materials in selected amounts. We find surprisingly that the chosen coating materials give improved ageing resistance in comparison with other materials which might be expected to give equivalent performance. We find also that they do not adversely affect the biological solubility of the fibres as measured in the Gamble's solution test.

The mineral fibre products of the invention can be used for any of the purposes for which stone, rock or slag wool fibres are known. In particular they are useful in applications where the mineral fibre product is put in position and remains there over a number of months or even years, for instance insulation applications. The product may be used in bonded or unbonded form, but preferably is in bonded form.

According to a preferred second aspect of the invention we provide a rigid bonded mineral fibre product comprising composite man-made vitreous fibres having a coating-core configuration wherein the core provides at least 90% by weight of the fibre and is formed of mineral melt formed of components having the following composition, expressed by weight of oxides:

| | |
|---|---|
| $SiO_2$ | 45–60 |
| $Al_2O_3$ | 0–4 |
| MgO | 0–20 |
| CaO | 10–45 |
| FeO (total iron) | 0–15 |
| $Na_2O + K_2O$ | 0–7 |
| $P_2O_5$ | 0–10 |
| $B_2O_3$ | 0–10 |
| $TiO_2$ | 0–3 |
| $P_2O_5 + B_2O_3$ | 0–10 |
| Others | 0–2 | and chosen such that fibres formed from the core alone have a solubility of at least 20 nm/day in Gamble's solution at pH 7.5 and 37° C.

and the coating is coated onto the core and comprises a salt which is a phosphate or hydrogen phosphate of ammonium or quaternary ammonium or alkali metal in an amount of at least 0.3% based on the weight of the core.

Rigid bonded mineral fibre products have a particular need for ageing resistance but commercially they are desired to show adequate biological solubility. By the invention we can meet both of these needs.

According to a third aspect of the invention we also provide a process for the production of a composite man-made vitreous fibre comprising providing fibres formed from mineral melt and having the following composition, expressed by weight of oxide:

| | |
|---|---|
| $SiO_2$ | 35–66 |
| $Al_2O_3$ | 0–12 |
| MgO | 0–30 |
| CaO | 10–45 |
| FeO (total iron) | 0–15 |
| $Na_2O + K_2O$ | 0–10 |
| $P_2O_5$ | 0–10 |
| $B_2O_3$ | 0–10 |
| $TiO_2$ | 0–10 |
| Others | 0–10 | the fibres having a solubility of at least 20 nm/day in Gamble's solution at pH 7.5 and 37° C., providing a coating composition which comprises a salt which is a phosphate or hydrogen phosphate of ammonium or quarternary ammonium or alkali metal, and coating this coating composition onto the fibres in an amount such that the salt is present on the fibres in an amount of at least 0.3% based on the weight of fibres.

In this method we provide stone, rock or slag fibres which are designed to have good biological solubility and are termed "soluble" fibres and provide on them a coating to improve the ageing resistance of products made from these fibres. Preferably the coated fibre product of the process includes a binder. The product is cured to form a rigid bonded mineral fibre product such as traditional fire, heat or sound insulating materials, growing substrates or roof, facade or wall sheeting. It may be in the form of for instance a batt or pipe section.

In the invention the mineral melt which forms the core of the composite fibres is a rock, stone or slag melt and has a composition within the ranges set out above. Preferably the amount of MgO is 2 to 30%, the amount of Cao is 10 to 45%, the amount of $Na_2O+K_2O$ is 0 to 10% and the amount of $B_2O_3$ is 0 to 10%. In particular the amount of $SiO_2$ is generally in the range 35 to 66%, often 45 to 60% and most preferably 50 to 56%. The amount of $Al_2O_3$ is generally below 4% and preferably below 2.5%. It is usually convenient for it to be at least 0.2% and often at least 1 or 1.5%. The amount of MgO is usually below 20% and preferably below 16%, preferably below 11%. It is usually at least 4% or 6%, preferably at least 8%. The amount of CaO is generally below 35%, preferably below 30%. It is often at least 15%. The amount of FeO is generally below 12% and preferably below 8%. It can be below 3%. It may be above 2%. The amount of alkali ($Na_2O+K_2$) is usually below 7% and preferably below 6%. Often each is present in an amount of 0 to 2% with the total amount often being 0.1 to 3%. The total amount of $P_2O_5+B_2O_3$ is often in the range 3 to 10%.

The amount of $TiO_2$ is generally at least 0.1% and is usually below 2 or 3%.

In all the compositions which are used in the invention, if $Al_2O_3$ is low, for instance below 3 or 4%, satisfactory solubility can be achieved in the absence of $P_2O_5$, but it is usually preferred for the amount of $P_2O_5$ to be at least 1 or 2%. Often it is at least 3%. Amounts of more than about 6 or 7% are usually unnecessary. $B_2O_3$ can be included to supplement the solubility properties, in which event it is normally present in amounts of at least 1%, and usually at least 2%, although it can be present in amounts of 0 to 2%. The amount is not usually more than 6 or 7%.

The amount of other oxides is usually below 10% and preferably below 5% or 2%. Frequently it is zero. Other oxides may include $ZrO_2$, SrO, BaO, ZnO, MnO, CuO and $Cr_2O_3$.

At least 90% by weight of the composite fibre is provided by the core which is formed from the defined mineral melt. Generally the core provides at least 95%, often at least 98%, by weight of the composite fibre. Often at least 99% or 99.5% by weight of the composite fibre is provided by the core.

The coating part of the composite fibre comprises a salt selected from ammonium, quaternary ammonium or alkali metal salts of phosphates and hydrogen phosphates. This salt is present in an amount of at least 0.3% by weight of the core. In amounts below this ageing resistance performance can be unreliable. Amounts of salt can be 0.5% and above, for instance 1 or 2% or greater, based on the weight of the core. Normally amounts of salt greater than 8% or 5% by weight of the core are not necessary. Amounts below 2% can be preferred for reasons of economy.

Ammonium salts are preferred, in particular diammonium salts. Preferred salts are diammonium hydrogen phosphate and ammonium dihydrogen phosphate.

The coating can comprise other materials. For instance it can comprise a silane. Silanes as described in WO94/02427 can be used, for instance amino silanes, alkylaminosilanes, vinyl silanes, mercaptosilanes, halogeno silanes, acrylosilanes, alkacrylosilanes, glycidyloxy silanes, cyanosilanes, thiocyanosilanes and mixtures thereof. Amino silanes are preferred, for instance 3-aminopropyl trimethoxysilane and 3-aminopropyl triethoxysilane. The silane may be hydrophobic.

When silane is included it is generally present in amounts of 0.01 to 1%, preferably 0.05 to 0.2%, based on the weight of the core. When silane and salt are combined the amount by weight of salt in the coating is usually from 0.1 to 50 times, often 2 to 30 times, the amount by weight of silane in the coating.

For reasons of economy and simplicity of production, products and processes may be preferred in which the coating consists essentially of one of the defined salts, or consists essentially of a mixture of two or more of the defined salts.

The composite fibres of the invention can be produced by the process of the third aspect of the invention. Normally fibres are produced from the mineral melt in standard fashion. These fibres are then provided with a coating by applying to them a coating composition which comprises one of the defined salts. A single coating composition may be used. Alternatively, more than one composition may be applied to the uncoated fibres. This is particularly useful if coating materials additional to the defined salt or salts are to be used, for instance silanes, or if two or more different types of salt are to be used.

Coating composition may be applied to the fibres immediately after they are formed and before they have been collected into a web, batt or other product. For instance the coating composition can be applied in the same way as binder is usually applied close to or surrounding the fibre forming apparatus, and may be applied before the binder. Coating materials may be applied as a component of binder solution applied in conventional manner.

Coating composition may be applied by immersing fibres or fibre mat in a solution, suspension or emulsion of coating components.

The defined salts are usually soluble and therefore usually applied in the form of an aqueous solution. If used, silanes may be soluble or insoluble in water and are usually applied in the form of a solution, emulsion or suspension in water.

Preformed fibre web may be coated if any of the components to be coated is gaseous at a convenient temperature.

Fibres may be coated in a fluid bed with the use of spray apparatus to spray a solution, dispersion, suspension or emulsion containing coating material. Fluid bed coating is particularly convenient for fibres which are used in loose fibre form rather than in web or batt form.

Water-soluble salts of the defined type, and other water-soluble salts if used, may be applied in microencapsulated form within a coating of alkali soluble material. This alkali soluble coating would dissolve when a local concentration of high pH is built up on the fibre due to condensation of ambient humidity onto the fibres. The salt or salts would then be released.

In the invention it is preferred that the coating material should be distributed across essentially the full surface area of the fibres, rather than only as spot bonds at their intersections.

Measurement of biological solubility of both the composite fibres and the core or uncoated fibres is measured by the standard test of immersion in Gamble's solution at pH 7.5 and 37° C. as described by Christensen et al in Environmental Health Perspective, Volume 102, Supplement Oct. 5, 1994, pages 83 to 86 (Stationary Set-Up).

The core or uncoated fibres have a solubility as measured by this test of at least 20 nm/day, preferably at least 40 or 50 nm/day and often 60 nm/day or greater. Solubility may be up to 100 nm/day.

Preferably the composite coated fibres also have adequate biological solubility and therefore preferably they also give solubility of at least 20 nm/day using this test, preferably at least 40 or 50 nm/day and often 60 nm/day or greater. Solubility may be up to 100 nm/day.

The invention provides composite fibres which have good ageing resistance, that is to say they have good resistance to condensation and ambient humidity. Ageing resistance may be measured in various different ways. Three accelerated ageing tests which we find useful are as follows.

The first method (the "first immersion test") comprises immersing 300 mg coated or uncoated fibres in 15 ml deionised water initially at pH 7.5 and 37° C. This test is designed to simulate the effect of small amounts of condensation on the fibres.

This test may also be carried out at various other temperatures to simulate different potential environments. In general we believe that higher temperatures of exposure result in greater dissolution rate.

The second method (the "second immersion test") comprises immersing 0.5 g of fibres in 10 ml deionised water initially at pH 7.5 in a polyethylene flask with lid for the specified amount of time and at specified temperature.

The third method is the "condensation test". In this method fibres are exposed to 100% relative humidity at 70° C. in a climate cupboard. In this third test also various temperatures can be used.

Assessment of dissolution under these ageing tests can be carried out in various ways. We have found that the most reliable method is measurement of the pH surrounding the fibres. A high or generally increasing pH, in particular above pH 11, indicates degradation of the fibres. Where the pH can be caused to decrease over time or to remain at a steady, low value, in particular below pH 11, for instance below pH 10.5, this indicates good ageing resistance.

Other methods of assessing dissolution can be used. For instance the levels of salts in the dissolution water can be measured, to assess how much of the fibre material has dissolved into the water. Measurements can be used which are similar to those used for the Gamble's solution test, giving results in nm/day. Microscopy, for instance scanning electron microscopy (SEM), can also be used. We find these methods useful in combination with pH measurement, but used alone they can be less reliable statistically than the pH measurement tests.

The invention will now be illustrated with reference to the following examples.

EXAMPLE 1

Fibres were produced having the following composition:

| | |
|---|---|
| $SiO_2$ | 47.6% |
| $Al_2O_3$ | 1.5% |
| $TiO_2$ | less than 0.1% |
| FeO (total iron) | 0.6% |
| CaO | 37.1% |
| MgO | 11.1% |
| $Na_2O$ | less than 0.1% |
| $K_2O$ | 0.2%. |

All percentages are by weight based on the oxide.

coating of the fibres is carried out as follows:

3 g of fibres plus 50 g coating solution is placed in an ultrasound bath for 10 minutes. Surplus liquid is drained off. The fibres are dried in a rotary film evaporator at water pump vacuum at 60° C. and cured at 20° C. for 15 minutes.

Exposure and accelerated ageing under simulated in-use conditions is carried out as follows:

0.5 g of fibres (coated or uncoated) are immersed in 10 ml deionised water in a polyethylene flask with lid for the specified amount of time and at the specified temperature (e.g. 70° C.). Similar results could be achieved using 300 mg fibres and 15 ml deionised water.

The tests carried out are as follows in Table 1 below.

TABLE 1

| Test | Coating (% by weight on fibres) | | Exposure Temperature (° C.) | Exposure Time (days) |
|---|---|---|---|---|
| | Silane | Salt | | |
| (i) | — | 1% DAHP | 70 | 28 |
| (ii) | 0.1% | 2% DAHP | 70 | 21 |

The coating amounts are given as percentage of total uncoated fibre weight. Each component is present in the coating solution in an amount of one tenth the amount based on fibre weight. The silane used is 3-amino propyl-triethoxy silane. The salt used is diammonium hydrogen phosphate (DAHP).

After the exposure tests observation of the coated and uncoated fibres shows that the coating has imparted some protection against erosion in the presence of humidity.

We find that protection can sometimes be obtained with the use of diammonium sulphate (eg at 5% or 10%, with or without 0.1% silane) as a coating material instead of phosphate, but this can be unreliable and is effective only in these larger, less economic amounts. The use of the silane alone (eg at 1%) tends not to give good results at low concentrations.

EXAMPLE 2

Fibres were produced having the following composition:

| | |
|---|---|
| $SiO_2$ | 47.6% |
| $Al_2O_3$ | 1.5% |
| $TiO_2$ | less than 0.1% |
| FeO (total iron) | 0.6% |
| CaO | 37.1% |
| MgO | 11.1% |
| $Na_2O$ | less than 0.1% |
| $K_2O$ | 0.2% |

All percentages are by weight based on the oxide.

Coating of the fibres is carried out as described in Example 1.

The test simulating in-use conditions was carried out as described in Example 1 at a temperature of 70° C.

Coating compositions are given below. All percentages are by weight based on the weight of the uncoated fibres. The silane used was 3-aminopropyl-triethoxy silane.

Ageing resistance was assessed by measuring the pH in the solution surrounding the fibres after various periods of time. Results are shown in the graphs attached as FIGS. 1 to 10.

| | |
|---|---|
| 1A | 0.01% silane |
| 1B | 0.01% silane + 0.1% DAHP |
| 1C | 0.01% silane + 0.2% DAHP |
| 1D | 0.01% silane + 0.5% DAHP |
| 1E | 0.01% silane + 1% DAHP |
| 1F | 0.01% silane + 2% DAHP |
| 1G | uncoated |
| 2A | 0.1% silane |
| 2B | 0.1% silane + 0.1% DAHP |
| 2C | 0.1% silane + 0.5% DAHP |
| 2D | 0.1% silane + 1% DAHP |
| 2E | uncoated |
| 3A | 0.5% silane |
| 3B | 0.5% silane + 0.1% DAHP |
| 3C | 0.5% silane + 0.5% DAHP |
| 3D | 0.5% silane + 1% DAHP |
| 3E | uncoated |
| 4A | 0.1% silane |
| 4B | 0.1% silane + 0.1% diammonium sulphate (DAS) |
| 4C | 0.1% silane + 0.5% DAS |
| 4D | 0.1% silane + 1% DAS |
| 4E | uncoated |
| 5A | 0.1% silane |
| 5B | 0.1% silane + 0.1% aluminium ammonium sulphate (AAS) |
| 5C | 0.1% silane + 0.5% AAS |
| 5D | uncoated |
| 6A | 0.01% silane |
| 6B | 0.01% silane + 0.1% ammonium dihydrogen phosphate (ADHP) |
| 6C | 0.01% silane + 1% ADHP |
| 6D | uncoated |
| 7A | 0.5% silane |

-continued

| | |
|---|---|
| 7B | 0.5% silane + 0.1% ADHP |
| 7C | 0.5% silane + 1% ADHP |
| 7D | uncoated |
| 8A | 0.1% silane |
| 8B | 0.1% silane + 0.1% ADHP |
| 8C | 0.1% silane + 0.2% ADHP |
| 8D | 0.1% silane + 0.5% ADHP |
| 8E | 0.1% silane + 1% ADHP |
| 8F | uncoated |
| 9A | 0.1% DAHP |
| 9B | 0.5% DAHP |
| 9C | 1% DAHP |
| 9D | 2% DAHP |
| 9E | uncoated |
| 10A | 0.1% ADHP |
| 10B | 0.5% ADHP |
| 10C | 1% ADHP |
| 10D | 2% ADHP |
| 10E | uncoated |
| 11A | 1% DAS |
| 11B | uncoated. |

The results shown in the attached tables show the consistent maintenance of a lowered pH when 0.3% or more of DAHP or ADHP is included in the coating. This improvement is observed with and without silane.

Figure 1:
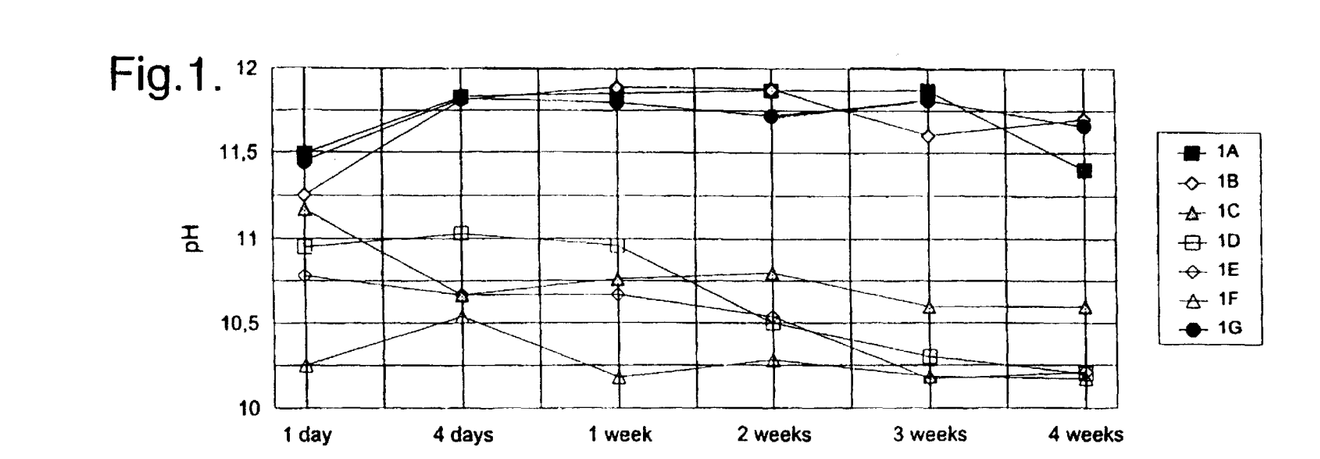
FIGS. 1 through 11 are graphs showing the pH of the solutions surrounding fibres described in Example 2.
Figure 2:
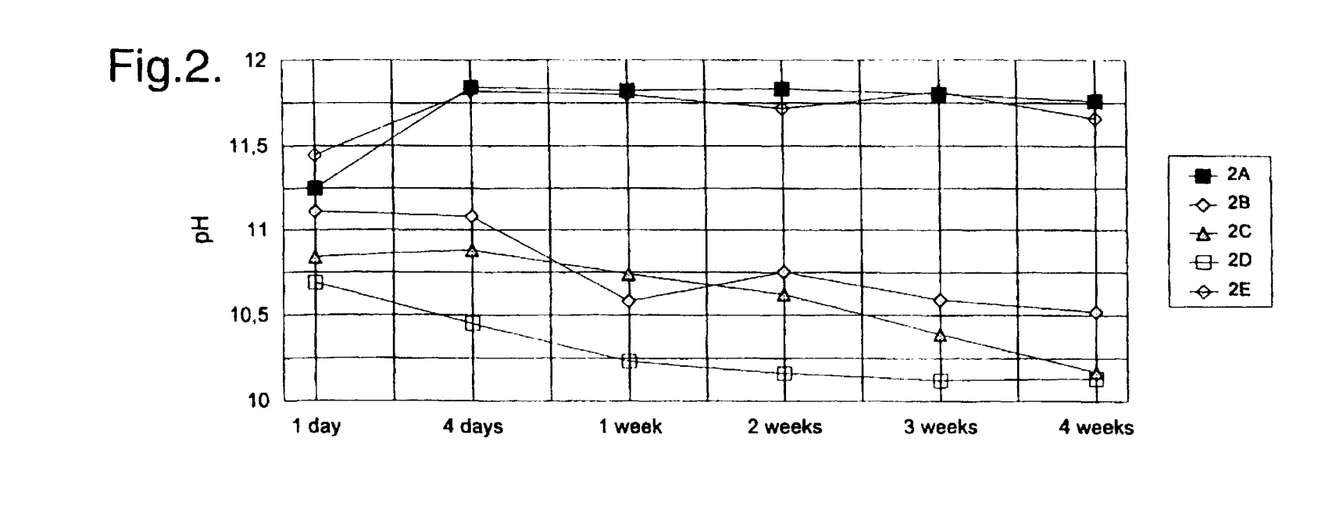
Figure 3:
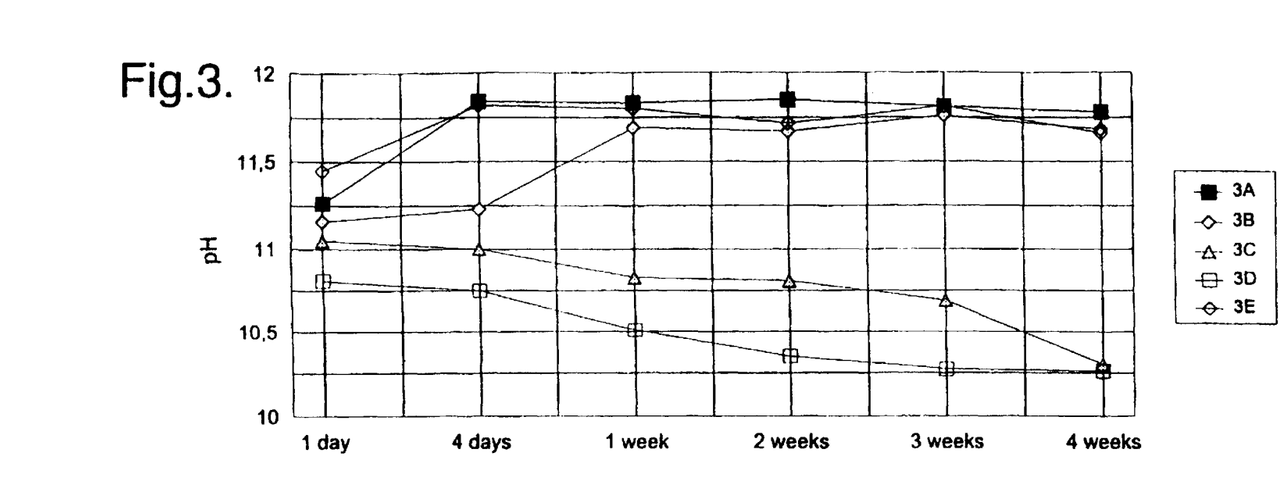
Figure 4:
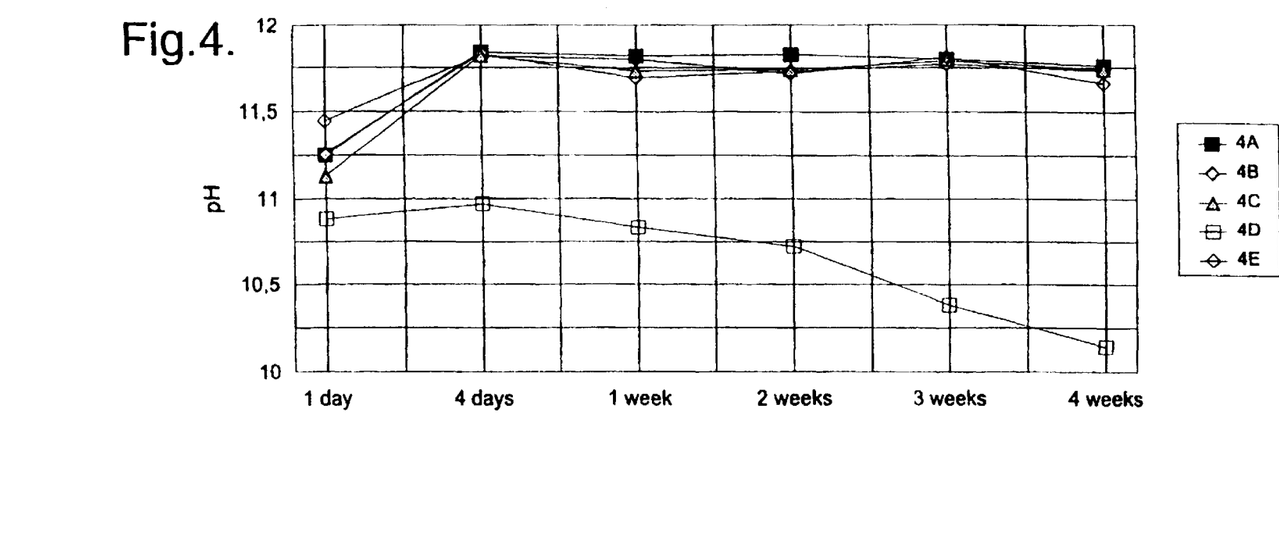
Figure 5:
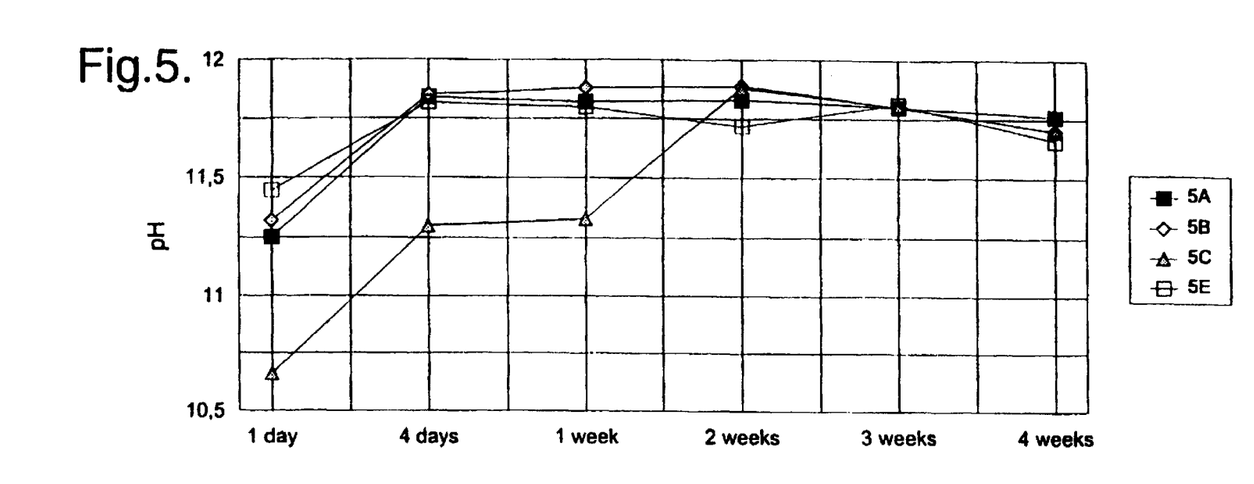
Figure 6:
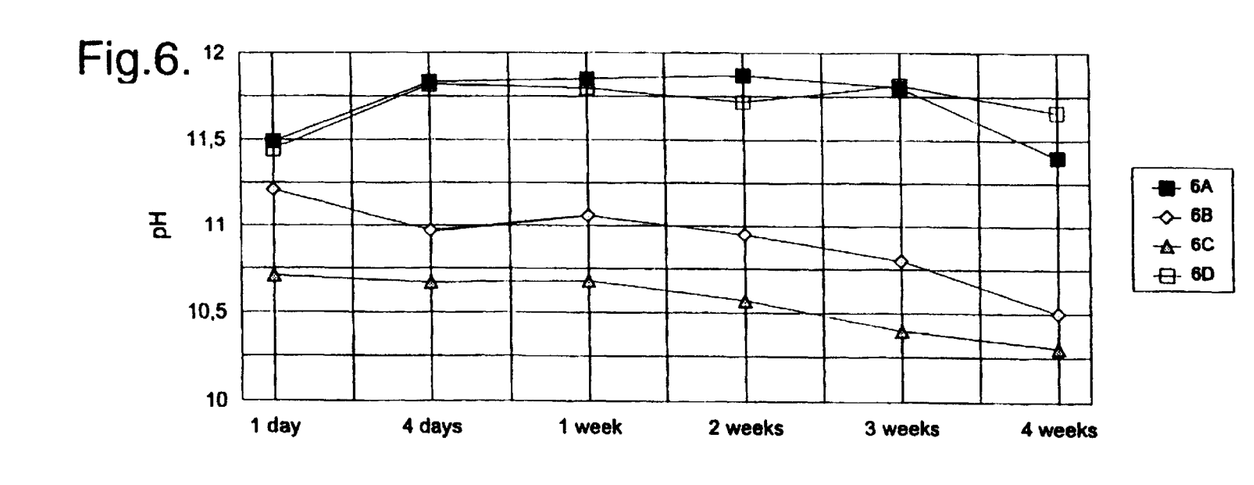
Figure 7:
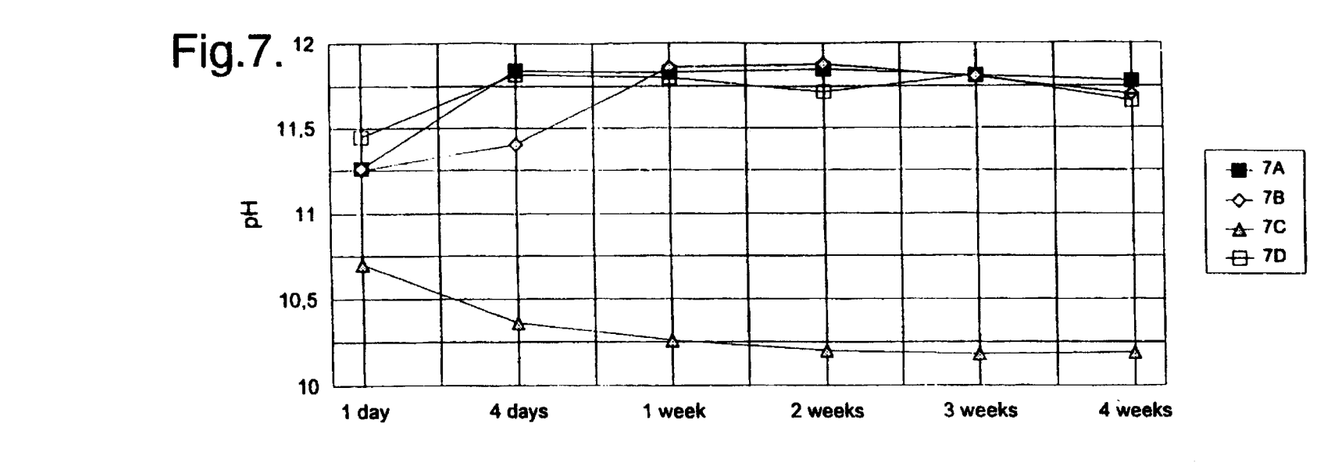
Figure 8:
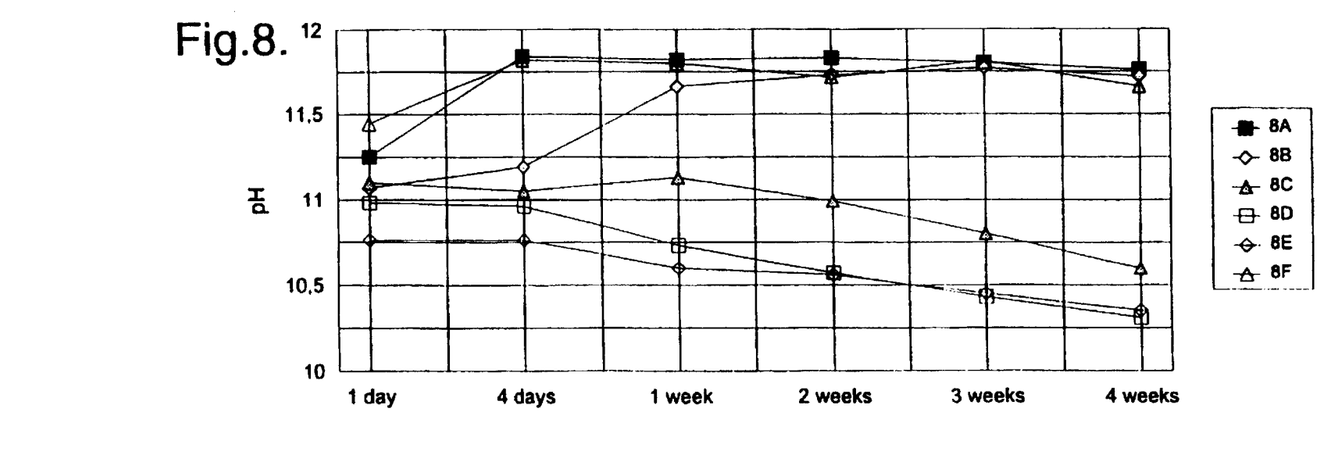
Figure 9:
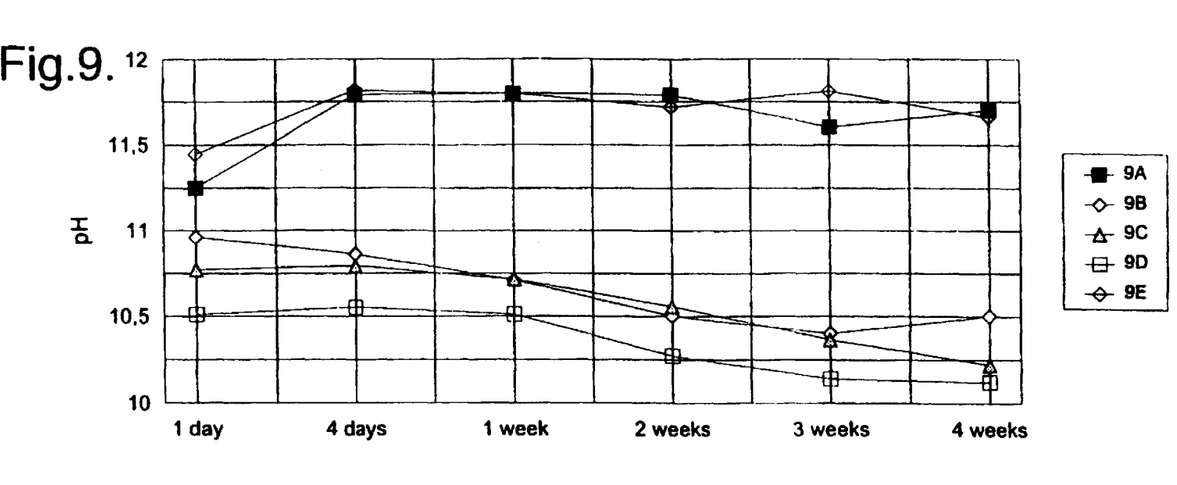
Figure 10:
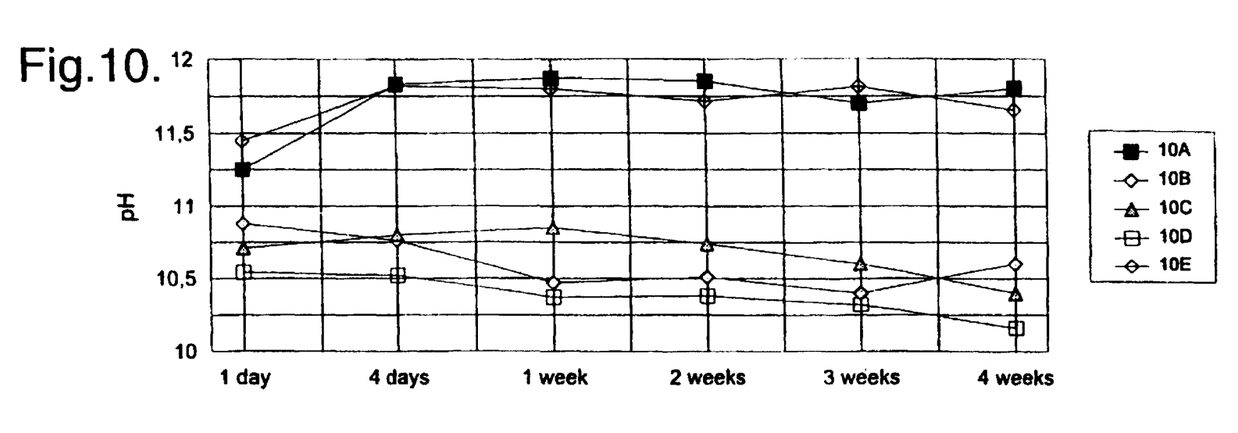
Figure 11:
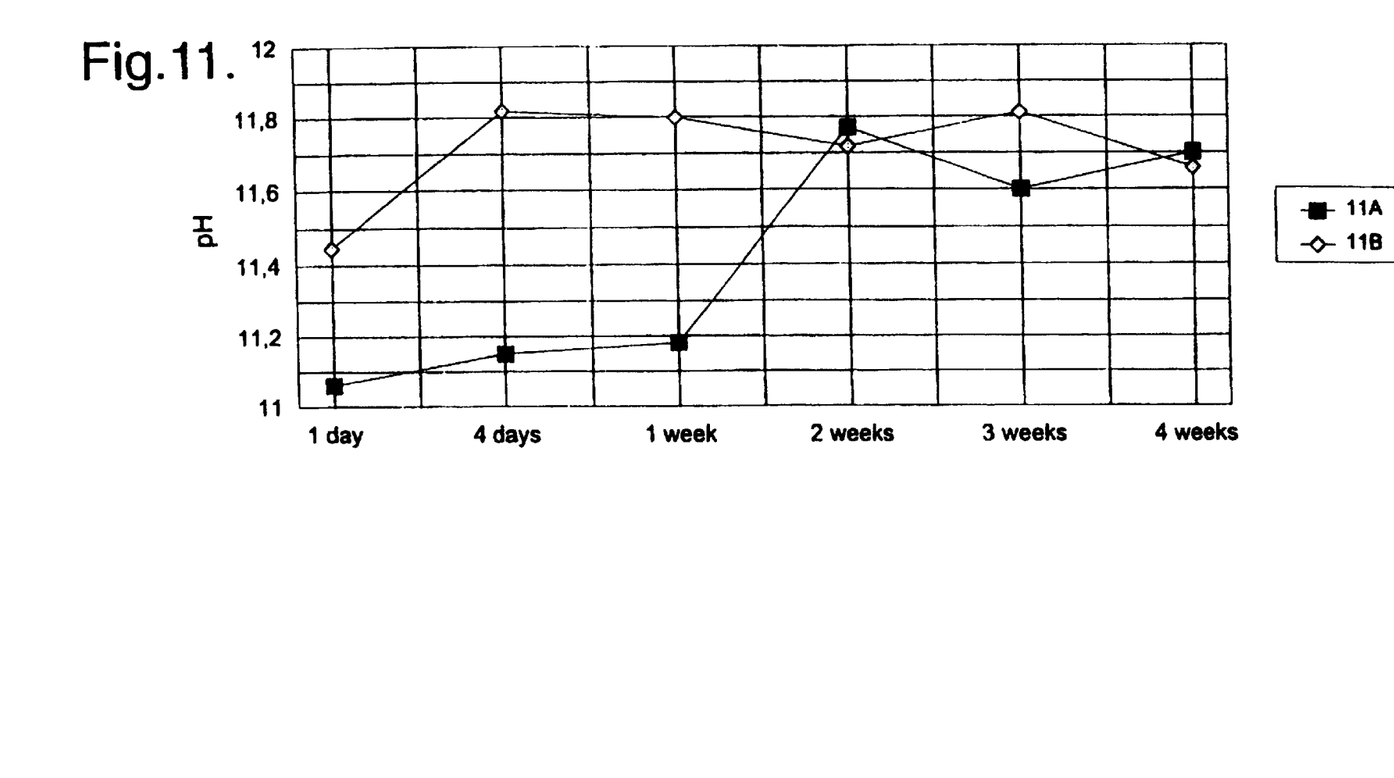

The results in FIGS. 4, 5 and 11 show that sulphates give inconsistent and unreliable results, in contrast with the reliable stabilisation obtained using amounts of DAHP and ADHP as low as 0.3%.

Some of the above results were confirmed by taking SEM photographs of the fibres before and after four weeks exposure in this test. Other coatings were also used. The table below indicates ("yes" or "no") whether or not the fibres underwent significant erosion during the four-week test period.

| Composition | Erosion |
|---|---|
| 1A | YES |
| 1B | YES |
| 1C | NO |
| 1D | NO |
| 1E | NO |
| 1F | NO |
| 2A | YES |
| 2B | NO |
| 2C | NO |
| 2D | NO |
| 3A | YES |
| 3B | YES |
| 3C | NO |
| 3D | NO |
| 4B | YES |
| 4C | YES |
| 4D | NO |
| 5B | YES |
| 5C | YES |
| 6B | NO |
| 6C | NO |
| 7B | YES |
| 7C | NO |
| 8B | YES |
| 8D | NO |
| 8E | NO |
| 9A | YES |
| 9B | NO |
| 9C | NO |
| 9D | NO |
| 10A | YES |
| 10B | NO |

-continued

| Composition | Erosion |
|---|---|
| 10C | NO |
| 11A | YES |
| 0.01% silane + 0.1% AAS | YES |
| 5% silane | NO |
| Ion exchanged water | YES |
| Uncoated | YES |

The solubility of the fibres in the Gamble's solution test was also measured. The coated fibres remain substantially similar in biological solubility to the uncoated fibres.

Comparative Example

Fibres were produced having the same composition as in Example 1.

Coating of the fibres is carried out as described in Example 1.

The test simulating in-use conditions was carried out as described in Example 1 at a temperature of 70° C.

As coating was used oxalic acid in an amount of 1% of the fibre weight.

After the exposure tests observations of the coated and uncoated fibres shows that the coating did not impart protection against corrosion in the presence of humidity.

What is claimed is:

1. A process for the production of composite man-made vitreous fibres comprising providing fibres formed from mineral melt and having the following composition, expressed by weight of oxide:

| | |
|---|---|
| $SiO_2$ | 35–66 |
| $Al_2O_3$ | 0–12 |
| MgO | 0–30 |
| CaO | 10–45 |
| FeO (total iron) | 0–15 |
| $Na_2O + K_2O$ | 0–10 |
| $P_2O_5$ | 0–10 |
| $B_2O_5$ | 0–10 |
| $TiO_2$ | 0–10 |
| Others | 0–10 | the fibres having a solubility of at least 20 nm/day in Gamble's solution at pH 7.5 and 37° C., providing a coating composition which comprises a salt which is a phosphate or hydrogen phosphate of ammonium, quaternary ammonium or alkali metal, and in which the amount of salt in the coating composition is not more than 0.2 wt. %, and coating this coating composition onto the fibres in an amount such that the salt is present on the fibres in an amount of at least 0.3% based on the weight of fibres.

2. A process according to claim 1 in which the salt is an ammonium salt.

3. A process according to claim 1 in which the salt is diammonium hydrogen phosphate or ammonium dihyrdrogen phosphate.

4. A process according to claim 1 in which the mineral melt is formed from components such that fibres formed from the core alone have a solubility of at least 40 nm/day in Gamble's solution at pH 7.5 and 37° C.

5. A process according to claim 1 in which the coated fibres have a solubility of at least 20 nm/day in Gamble's solution at pH 7.5 and 37° C.

6. A process according to claim 1 in which the coating additionally comprises a silane.

7. A process according to claim 6 in which the amount of silane in the coating is from 0.01 to 1% based on the weight of the core and the salt is a salt of ammonium of alkali metal and is preferably present in an amount of at least 1% based on the weight of the core.

8. A process according to claim 1 in which the mineral melt is formed from components having the following composition, expressed by weight of oxides:

| | |
|---|---|
| $SiO_2$ | 45–60 |
| $Al_2O_3$ | 0.2–4 |
| MgO | 6–16 |
| CaO | 10–45 |
| FeO | 2–15 |
| $Na_2O + K_2O$ | 0–7 |
| $P_2O_5$ | 0–5 |
| $B_2O_3$ | 0–2 |
| $TiO_2$ | 0–3 |
| Others | 0–2. |

9. A process according to claim 1 in which the amount of salt in the coating composition is not more than 1%.

10. A process according to claim 1 additionally comprising forming the coated fibres into a rigid bonded mineral fibre product.

11. A process according to claim 10 comprising forming the fibres into a batt or pipe section.

12. A process according to claim 10 comprising forming the fibres into a growing substrate.

13. A process according to claim 10 in which the mineral melt is formed from components having the following composition, expressed by weight of oxides:

| | |
|---|---|
| $SiO_2$ | 45–60 |
| $Al_2O_3$ | 0–4 |
| MgO | 0–20 |
| CaO | 10–45 |
| FeO | 0–15 |
| $Na_2O + K_2O$ | 0–7 |
| $P_2O_5$ | 0–10 |
| $B_2O_3$ | 0–10 |
| $TiO_2$ | 0–3 |
| $P_2O_5 + B_2O_3$ | 0–10 |
| Others | 0–10. |

14. A process according to claim 1 in which the mineral melt is formed from components having the following composition, expressed by weight of oxides:

| | |
|---|---|
| $SiO_2$ | 45–60 |
| $Al_2O_3$ | 0.2–4 |
| MgO | 6–11 |
| CaO | 10–30 |
| FeO | 2–15 |
| $Na_2O + K_2O$ | 0–7 |
| $P_2O_5$ | 0–10 |
| $B_2O_3$ | 0–10 |
| $TiO_2$ | 0–3 |
| Others | 0–2. |

15. A process according to claim 1 in which the mineral melt is formed from components having the following composition, expressed by weight of oxides:

| | |
|---|---|
| $SiO_2$ | 45–60 |
| $Al_2O_3$ | 1–4 |
| MgO | 6–11 |
| CaO | 10–30 |
| FeO | 2–9 |
| $Na_2O + K_2O$ | 0.1–7 |
| $P_2O_5$ | 0–6 |
| $B_2O_3$ | 0–6 |
| $TiO_2$ | 0.1–3 |
| Others | 0–2. |

16. A process for improving the ageing resistance of composite man-made vitreous fibres comprising providing a mineral melt formed from components having the following composition, expressed by weight of oxides:

| | |
|---|---|
| $SiO_2$ | 35–66 |
| $Al_2O_3$ | 0–12 |
| MgO | 0–30 |
| CaO | 10–45 |
| FeO (total iron) | 0–15 |
| $Na_2O + K_2O$ | 0–10 |
| $P_2O_5$ | 0–10 |
| $B_2O_3$ | 0–10 |
| $TiO_2$ | 0–10 |
| Others | 0–10 | and forming the melt into fibres which have a solubility of at least 20 nm/day in Gamble's solution at pH 7.5 and 37° C.

and coating onto the fibres a coating which comprises a salt which is phosphate or hydrogen phosphate of ammonium or quaternary ammonium or alkali metal in an amount such that the amount of salt applied is at least 0.3% based on the weight of the fibres, whereby the ageing resistance of the fibres is improved by the coating.

17. A process according to claim 16 in which the mineral melt is formed from components having the following composition, expressed by weight of oxides:

| | |
|---|---|
| $SiO_2$ | 45–60 |
| $Al_2O_3$ | 0.2–4 |
| MgO | 6–16 |
| CaO | 10–45 |
| FeO | 2–15 |
| $Na_2O + K_2O$ | 0–7 |
| $P_2O_5$ | 0–5 |
| $B_2O_3$ | 0–2 |
| $TiO_2$ | 0–3 |
| Others | 0–2. |

18. A process according to claim 16 in which the amount of salt in the coating composition is not more than 1%.

19. A process according to claim 16 additionally comprising forming the coated fibres into a rigid bonded mineral fibre product.

20. A process according to claim 19 comprising forming the fibres into a batt or pipe section.

21. A process according to claim 19 comprising forming the fibres into a growing substrate.

22. A process according to claim 19 in which the mineral melt is formed from components having the following composition, expressed by weight of oxides:

| | |
|---|---|
| SiO$_2$ | 45–60 |
| Al$_2$O$_3$ | 0–4 |
| MgO | 0–20 |
| CaO | 10–45 |
| FeO | 0–15 |
| Na$_2$O + K$_2$O | 0–7 |
| P$_2$O$_5$ | 0–10 |
| B$_2$O$_3$ | 0–10 |
| TiO$_2$ | 0–3 |
| P$_2$O$_5$ + B$_2$O$_3$ | 0–10 |
| Others | 0–10. |

23. A process according to claim 16 in which the mineral melt is formed from components having the following composition, expressed by weight of oxides:

| | |
|---|---|
| SiO$_2$ | 45–60 |
| Al$_2$O$_3$ | 0.2–4 |
| MgO | 6–11 |
| CaO | 10–30 |
| FeO | 2–15 |
| Na$_2$O + K$_2$O | 0–7 |
| P$_2$O$_5$ | 0–10 |
| B$_2$O$_3$ | 0–10 |
| TiO$_2$ | 0–3 |
| Others | 0–2. |

24. A process according to claim 16 in which the mineral melt is formed from components having the following composition, expressed by weight of oxides:

| | |
|---|---|
| SiO$_2$ | 45–60 |
| Al$_2$O$_3$ | 1–4 |
| MgO | 6–11 |
| CaO | 10–30 |
| FeO | 2–9 |
| Na$_2$O + K$_2$O | 0.1–7 |
| P$_2$O$_5$ | 0–6 |
| B$_2$O$_3$ | 0–6 |
| TiO$_2$ | 0.1–3 |
| Others | 0–2. |

25. A method of insulation comprising providing a mineral fibre product which comprises
composite man-made vitreous fibres which have a coating-core configuration wherein the core provides at least 90% by weight of the fibre and is formed of mineral melt formed from components having the following composition, expressed by weight of oxides:

| | |
|---|---|
| SiO$_2$ | 35–66 |
| Al$_2$O$_3$ | 0–12 |
| MgO | 0–30 |
| CaO | 10–45 |
| FeO (total iron) | 0–15 |
| Na$_2$O + K$_2$O | 0–10 |
| P$_2$O$_5$ | 0–10 |
| B$_2$O$_3$ | 0–10 |
| TiO$_2$ | 0–10 |
| Others | 0–10 | and chosen such that fibres formed from the core alone have a solubility of at least 20 nm/day in Gamble's solution at pH 7.5 and 37° C.
and the coating is coated onto the core and comprises a salt which is a phosphate or hydrogen phosphate of ammonium or quaternary ammonium or alkali metal in an amount of at least 0.3% based on the weight of the core and using the product as insulation in an environment in which the product is exposed to humidity and/or condensation.

26. A process according to claim 25, in which the humidity and/or condensation arise due to wetting of the fibre product by occasional rain or application of cement or other water or natural humidity in the atmosphere.

27. A process according to claim 25 in which the mineral melt is formed from components having the following composition, expressed by weight of oxides:

| | |
|---|---|
| SiO$_2$ | 45–60 |
| Al$_2$O$_3$ | 0.2–4 |
| MgO | 6–16 |
| CaO | 10–45 |
| FeO | 2–15 |
| Na$_2$O + K$_2$O | 0–7 |
| P$_2$O$_5$ | 0–5 |
| B$_2$O$_3$ | 0–2 |
| TiO$_2$ | 0–3 |
| Others | 0–2. |

28. A process according to claim 25 in which the amount of salt in the coating composition is not more than 1%.

29. A process according to claim 25 additionally comprising forming the coated fibres into a rigid bonded mineral fibre product.

30. A process according to claim 29 comprising forming the fibres into a batt or pipe section.

31. A process according to claim 29 comprising forming the fibres into a growing substrate.

32. A process according to claim 29 in which the mineral melt is formed from components having the following composition, expressed by weight of oxides:

| | |
|---|---|
| SiO$_2$ | 45–60 |
| Al$_2$O$_3$ | 0–4 |
| MgO | 0–20 |
| CaO | 10–45 |
| FeO | 0–15 |
| Na$_2$O + K$_2$O | 0–7 |
| P$_2$O$_5$ | 0–10 |
| B$_2$O$_3$ | 0–10 |
| TiO$_2$ | 0–3 |
| P$_2$O$_5$ + B$_2$O$_3$ | 0–10 |
| Others | 0–2. |

33. A process according to claim 25 in which the mineral melt is formed from components having the following composition, expressed by weight of oxides:

| | |
|---|---|
| SiO$_2$ | 45–60 |
| Al$_2$O$_3$ | 0.2–4 |
| MgO | 6–11 |
| CaO | 10–30 |
| FeO | 2–15 |
| Na$_2$O + K$_2$O | 0–7 |
| P$_2$O$_5$ | 0–10 |
| B$_2$O$_3$ | 0–10 |
| TiO$_2$ | 0–3 |
| Others | 0–2. |

34. A process according to claim 25 in which the mineral melt is formed from components having the following composition, expressed by weight of oxides:

| | |
|---|---|
| SiO$_2$ | 45–60 |
| Al$_2$O$_3$ | 1–4 |
| MgO | 6–11 |
| CaO | 10–30 |
| FeO | 2–9 |
| Na$_2$O + K$_2$O | 0.1–7 |
| P$_2$O$_5$ | 0–6 |
| B$_2$O$_3$ | 0–6 |
| TiO$_2$ | 0.1–3 |
| Others | 0–2. |

\* \* \* \* \*